United States Patent [19]

Wilson

[11] Patent Number: 5,560,108
[45] Date of Patent: Oct. 1, 1996

[54] ELECTRIC TOOL WITH AN EXTENDABLE HANDLE

[75] Inventor: Michael Wilson, County Durham, United Kingdom

[73] Assignee: Black & Decker Inc., Newark, Del.

[21] Appl. No.: 351,961

[22] Filed: Dec. 8, 1994

[30] Foreign Application Priority Data

Dec. 10, 1993 [GB] United Kingdom ............... 9325353

[51] Int. Cl.[6] .................................................. A01D 55/00
[52] U.S. Cl. ........................ 30/276; 30/296.1; 174/69
[58] Field of Search ................................ 30/276, 296.1,
30/345, 383, 228, 210, 216, 122; 174/46,
69; 191/12 R; 242/588.2

[56] References Cited

U.S. PATENT DOCUMENTS

| | | | |
|---|---|---|---|
| 2,607,863 | 8/1952 | MacFarland | 174/69 X |
| 3,026,409 | 3/1962 | Deisch | 174/69 X |
| 3,809,800 | 5/1974 | Fletcher et al. | 124/69 X |
| 4,515,423 | 5/1985 | Moore et al. | |
| 4,976,031 | 12/1990 | Miller | 30/296.1 |

*Primary Examiner*—Douglas D. Watts
*Attorney, Agent, or Firm*—Charles E. Yocum; Dennis A. Dearing; Frederick H. Voss

[57] ABSTRACT

An electrically powered tool, in particular an electrically powered tool of the type which includes a shaft assembly of adjustable length, also includes: a handle assembly; a cable entry mounted in the handle assembly; a shaft assembly, one end of which is mounted in the handle assembly; a head mounted at the end of the shaft assembly remote from the handle assembly; an electric motor mounted within the head, and a cable which extends within the shaft assembly from the cable entry to the motor. The shaft assembly is adjustable to allow relative movement between the head and the handle assembly in the radial and/or the axial direction, and the cable follows a path within the shaft assembly which path is defined and which is variable depending on the extent of extension and/or rotation of the head relative to the handle assembly.

7 Claims, 3 Drawing Sheets

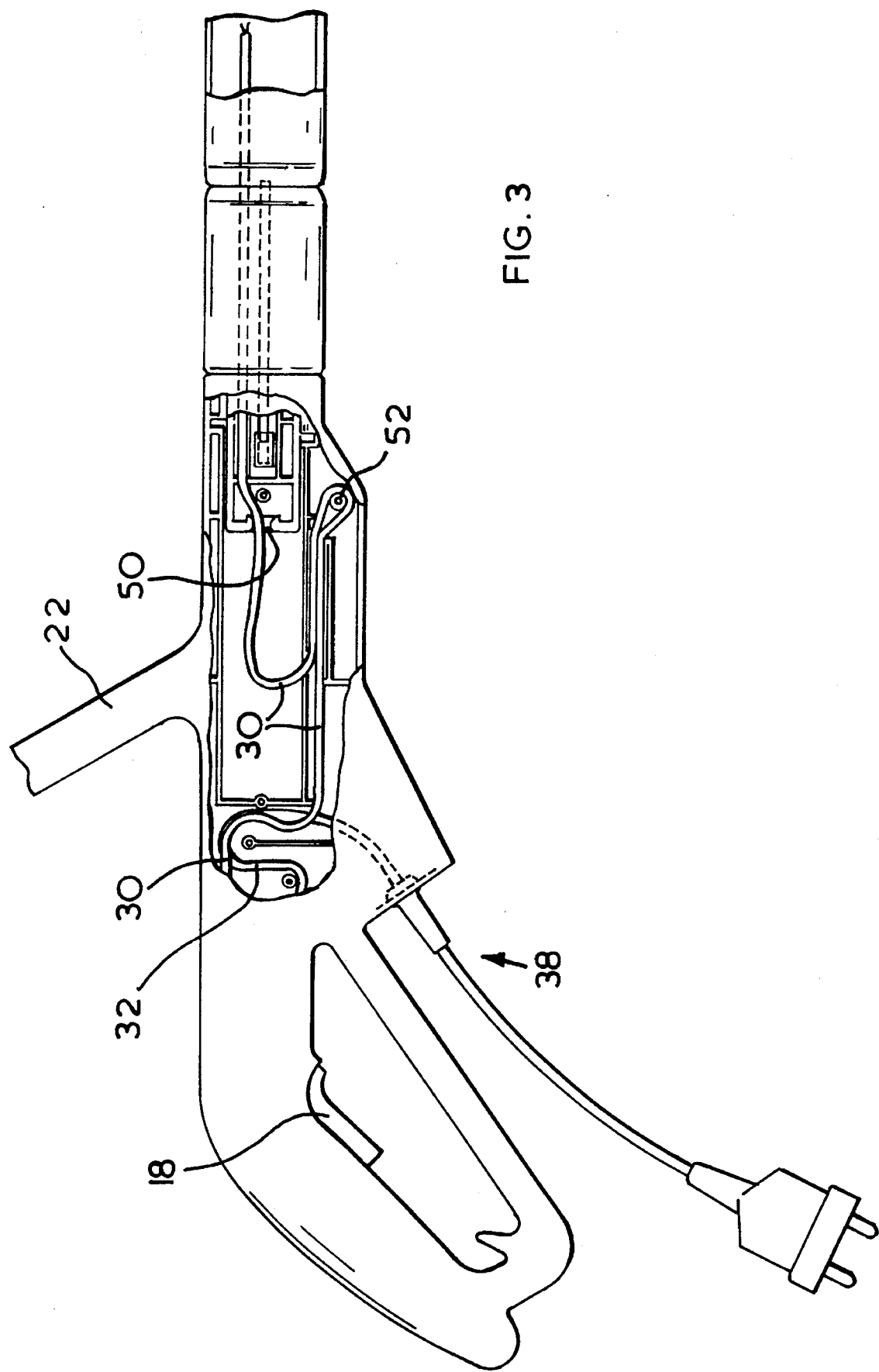

ELECTRIC TOOL WITH AN EXTENDABLE HANDLE

The present invention relates to an electrically powered tool, in particular an electrically powered tool of the type which comprises a shaft assembly of adjustable length, located between a handle assembly providing an entry for cable supplying electrical power and an electric motor mounted in a housing at the opposite end of the shaft assembly, and in which a cable for supplying electrical power extends along the inside of the shaft assembly from the cable entry to the electric motor.

Electrically powered tools of this type include vegetation cutters, in particular vegetation cutters which cut by means of a filament or strip that is rotated rapidly about an axis that may be either substantially vertical or substantially horizontal, depending upon the application.

In vegetation cutters of this type, radial adjustment is provided in particular so that the unit can be used for trimming, in which the cutting filament or strip is rotated about a substantially vertical axis and edging, in which the cutting filament or strip is rotated about a substantially horizontal axis. Axial, or length, adjustment is provided so that the tool can be adjusted to the optimum length for an individual operator, for either edging or trimming.

It is known to provide electrically powered tools of this type in which the cable for supplying electrical power is of the coiled or spirally wound type, which allows for extension and reduction of the length of the cable as the length of the shaft assembly is adjusted. Such cable is expensive.

It is an object of the present invention to provide an electrically powered tool in which the above disadvantages are reduced or substantially obviated.

BRIEF SUMMARY OF THE INVENTION

The present invention provides an electrically powered tool comprising a handle assembly, a cable entry mounted in the handle assembly, a shaft assembly, one end of which is mounted in the handle assembly, a head mounted at the end of the shaft assembly remote from the handle assembly, an electric motor mounted within the head, and a cable which extends within the shaft assembly from the cable entry to the motor, characterised in that the shaft assembly is adjustable to allow relative movement between the head and the handle assembly in the radial and/or the axial direction, and the cable follows a path within the shaft assembly which path is defined and which is variable depending on the extent of extension and/or rotation of the head relative to the handle assembly.

In a preferred embodiment of the tool according to the invention the shaft assembly is of clamshell construction, and the path is in the form of a labyrinth defined by internal structures within the clamshell.

The power tool according to the invention may be an adjustable tool in which the length adjustment of the shaft assembly is provided in any suitable manner, but it is in particular suitable if the shaft assembly is of the type described and claimed in our co-pending U.K. Pat. Application No. 9323110.8.

BRIEF DESCRIPTION OF THE SEVERAL VIEWS OF THE DRAWINGS

An embodiment of a power tool according to the invention will be further described with reference to the accompanying drawings, in which:

FIG. 3 is a similar view to FIG. 2, with the shaft assembly adjusted to the expanded position.

DETAILED DESCRIPTION

Figure 1:
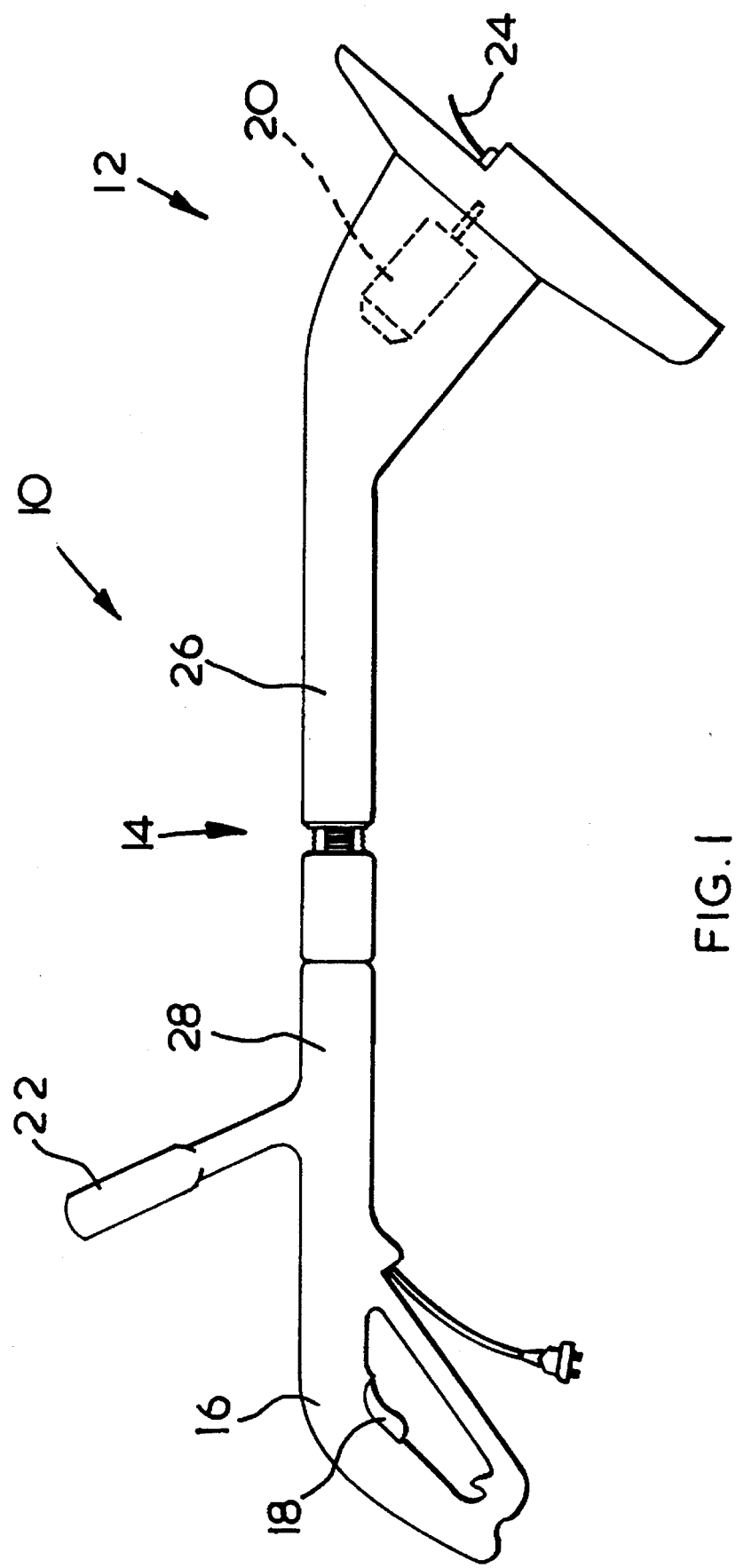
FIG. 1 is a view of an embodiment of a tool according to the invention.

As can be seen from FIG. 1, the electrically powered tool is a vegetation cutter (10) which comprises a lower housing or head (12) connected by a shaft assembly (14) to a handle assembly (16).

The handle assembly (16) provides a switch (18) for selectively supplying electrical power to an electric motor (20) carried within the housing (12). For two-handed operation of the trimmer, a secondary handle (22) is mounted on the handle assembly (16). The lower housing (12) carries a cutting head rotatable about an axis passing through the housing (12) and the cutting line (24) extends into a cutting plane which is substantially perpendicular to the axis of rotation of housing (12).

The shaft assembly (14) comprises a first shaft part (26) on which the head (12) is mounted and a second shaft part (28) on which the handle assembly (16) is mounted.

Relative axial and radial movement of the handle assembly (16) and hence the second shaft part (28), and the motor housing (12) and hence the first shaft part (26), are permitted and locking means are provided to lock the first shaft part (26) and second shaft part (28) in any relative radial and axial positions.

Figure 2:
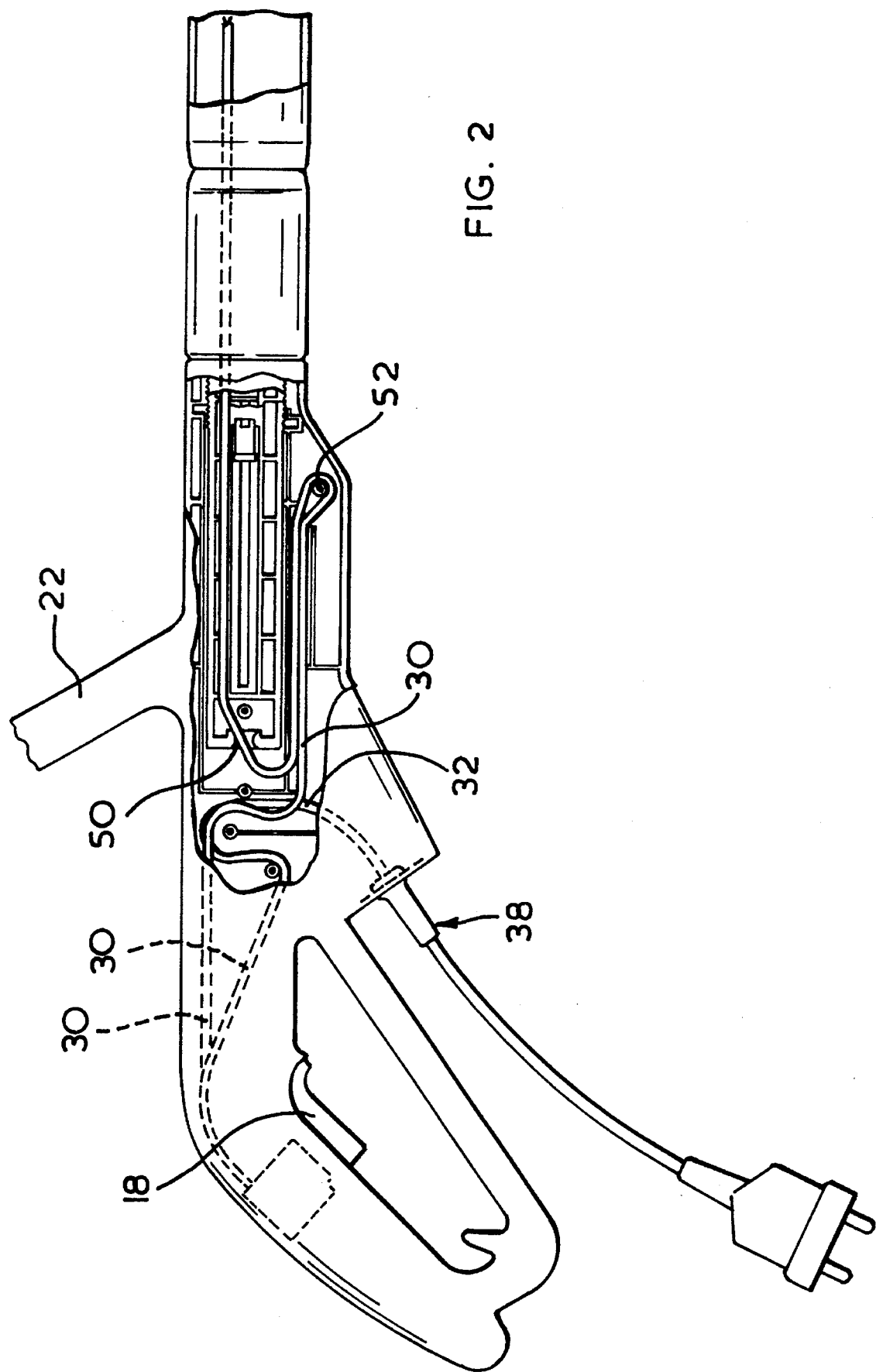
FIG. 2 is an enlarged view of a part of FIG. 1, partially in section, with the shaft assembly adjusted to the retracted position

As can be seen from FIG. 2, a cable (30) extends from the switch (18) to the motor (20). Electrical power is supplied to the switch (18) via a cable (32) connected to a cable entry (38) which is adapted to be connected to the electrical supply in known manner.

The first shaft part (26) is of clamshell construction, and comprises two mating parts. A bell mouth exit (50) is provided at the end of the first shaft part (26) remote from the motor (20). The cable (30) is inserted in the first shaft part (26) as shown in FIG. 2, and passes through the bell mouth exit (50). The cable (30) then passes around a fixed post (52) in the second shaft part (28), returns along a substantially parallel path and is then wired in known manner to the switch (18). The other end of the cable (30) is wired in known manner to the motor (20).

Therefore, as shown in FIG. 3, when the first part (26) of the shaft assembly (14) is moved forward to extend the shaft assembly (14) cable (30) is made available. However, when the first part (26) of the shaft assembly (14) is retracted, as in FIG. 2, cable (30) is consumed in the labyrinth.

The fixed post (52) around which the cable is passed may be located in any convenient part of the second shaft part (28), provided that when the tool is assembled and in the closed position, the linear distance at the fixed post (52) from the bell mouth exit (50) of the first shaft part (26) is at least half the maximum amount by which the tool can be extended.

The fixed post (52) may suitably be one of the screw bosses used to secure the two mating parts of the clamshell.

The cable (30) may be of any suitable type for use in a power tool of this kind. A particularly suitable cable is a twin core, multi-strand, oval cable, which has the required characteristics of strength and flexibility.

We claim:

1. An electrically powered tool comprising:

a shaft assembly having first and second parts;

a handle assembly mounted to an end of said shaft assembly;

a head mounted at the end of said shaft assembly remote from said handle assembly;

an electric motor located within said head;

wherein said shaft assembly can be positioned to extend and retract to adjust the distance between said handle and said head;

a cable located within said shaft assembly and connected between said handle assembly and said electric motor;

a bell mouth exit located at the end of the first part of said shaft assembly remote from said motor and through which said cable passes; and a fixed post within the second part of said shaft assembly and around which said cable passes;

such that when said shaft assembly is in a fully retracted position, the linear distance between said fixed post and said bell mouth exit is at least half the maximum distance by which said shaft assembly can be extended.

2. An electrically powered tool as claimed in claim 1, wherein:

said head is mounted on the first part of said shaft assembly; and said handle assembly is mounted on the second part of said shaft assembly.

3. An electrically powered tool as claimed in claim 1, wherein said fixed post is a screw boss used with said shaft assembly.

4. An electrically powered tool comprising:

a shaft assembly having first and second parts which extend and retract to adjust said shaft assembly to and between a maximum and minimum length;

a handle assembly mounted on the second part of said shaft assembly and near an end of said shaft assembly;

an electric motor located on the first part of said shaft assembly and near an end of said shaft assembly and remote from the handle assembly;

a cable located within said shaft assembly for providing electric power to said motor;

an exit for said cable located at the end of the first part of said shaft assembly remote from said motor;

a fixed structure within the second part of said shaft assembly about which said cable bends; and such that said cable in passing through said exit toward said handle reverses direction toward said motor, and then bends about said fixed structure, to again reverse direction toward said handle and follow a path substantially parallel to its previous path.

5. The tool as claimed in claim 4, such that when said shaft is fully retracted the linear distance between said exit and said fixed structure is at least half the maximum distance by which said shaft can be extend.

6. A tool as claimed in claim 4, wherein said exit is a bell mouth exit.

7. A tool as claimed in claim 4, wherein said fixed structure is a screw boss used with said shaft assembly.

* * * * *